Patented Mar. 1, 1932

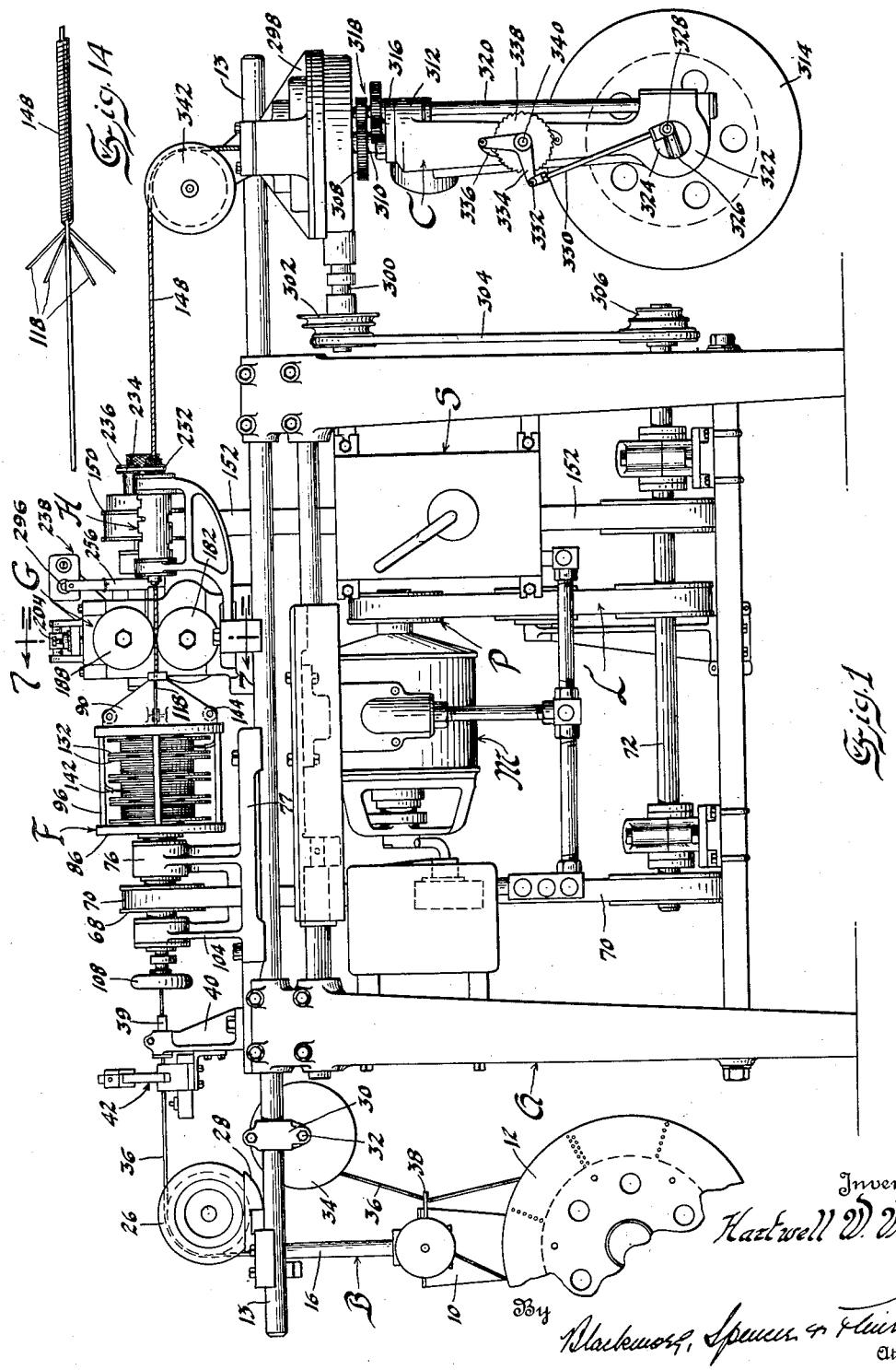

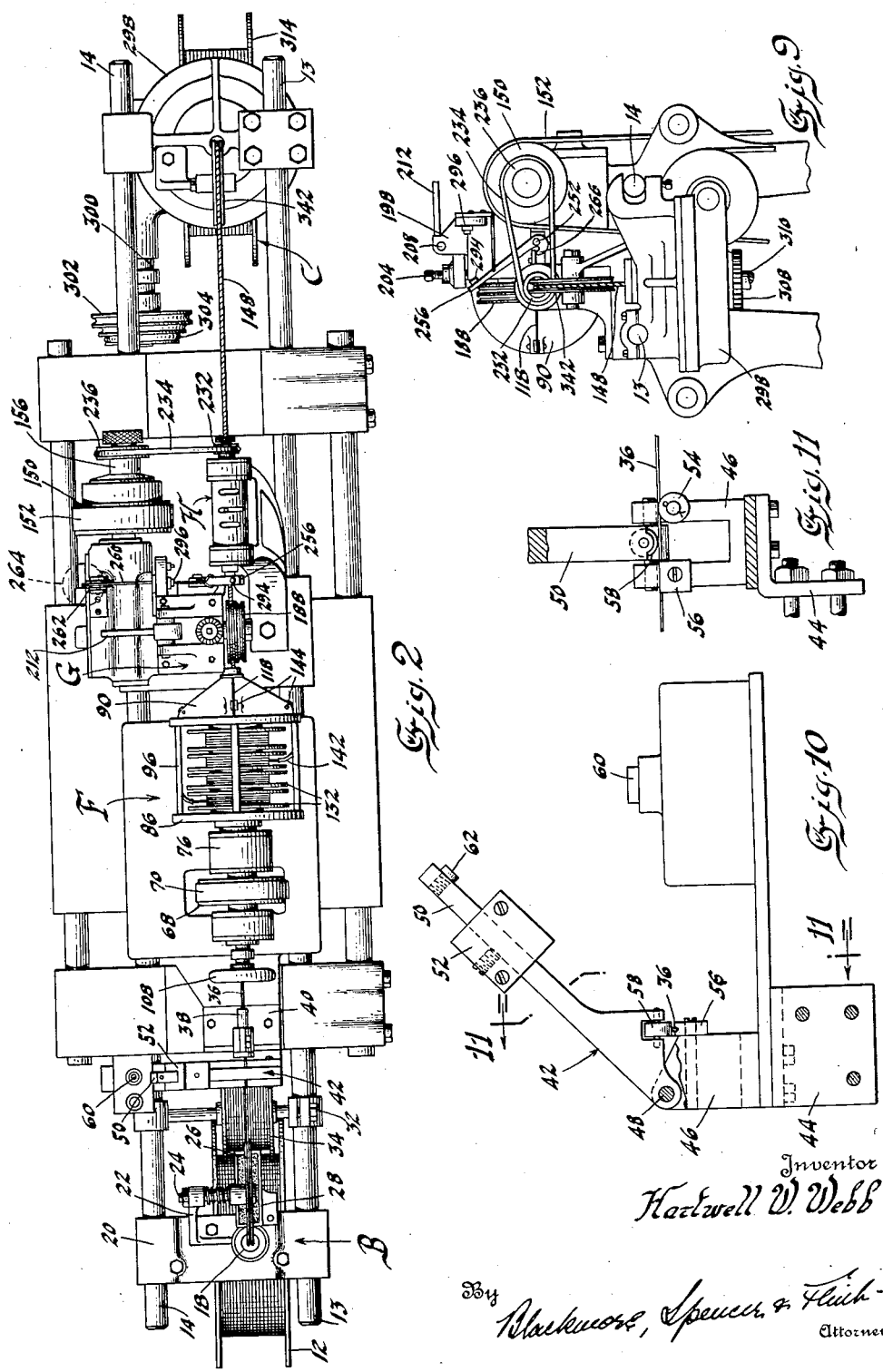

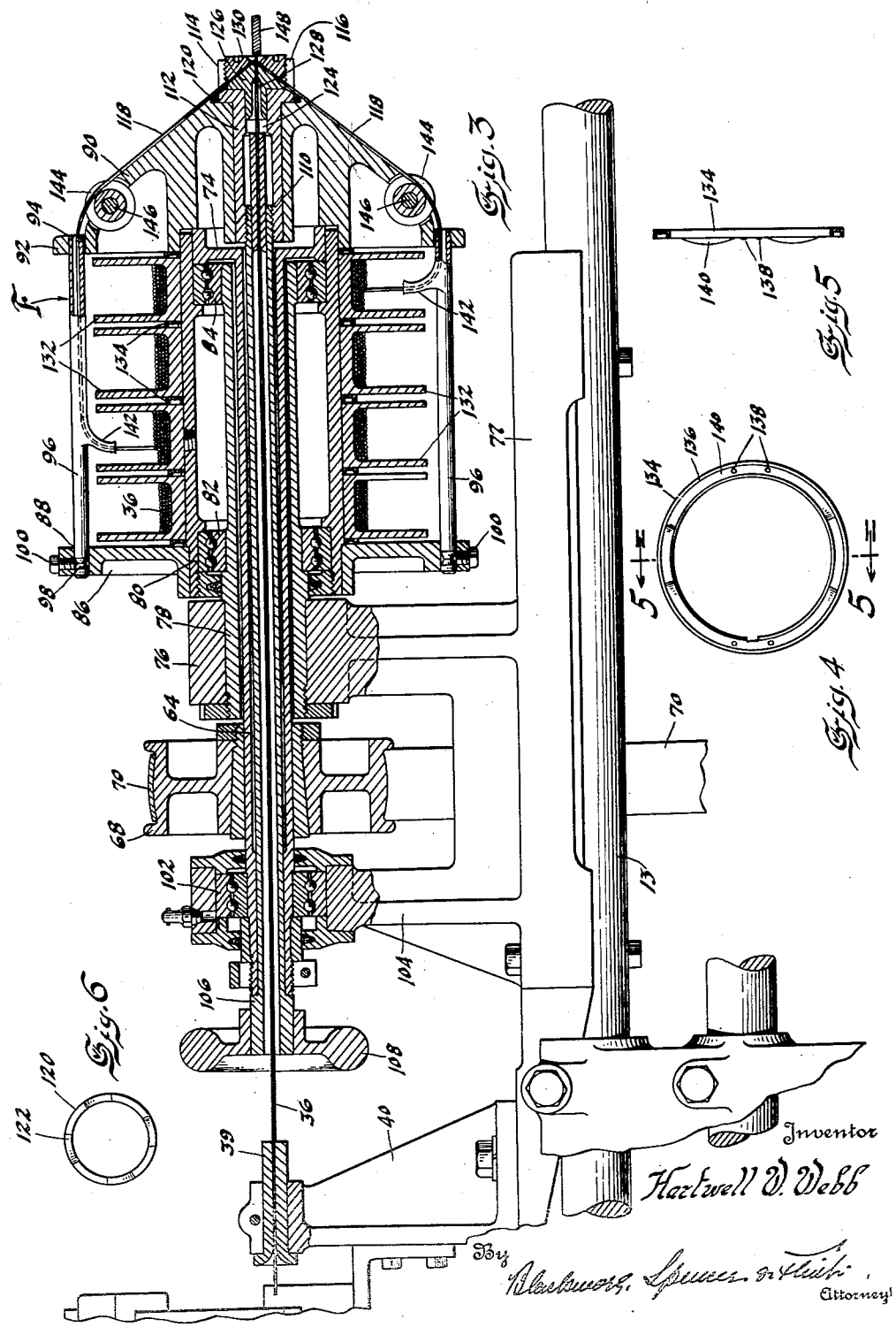

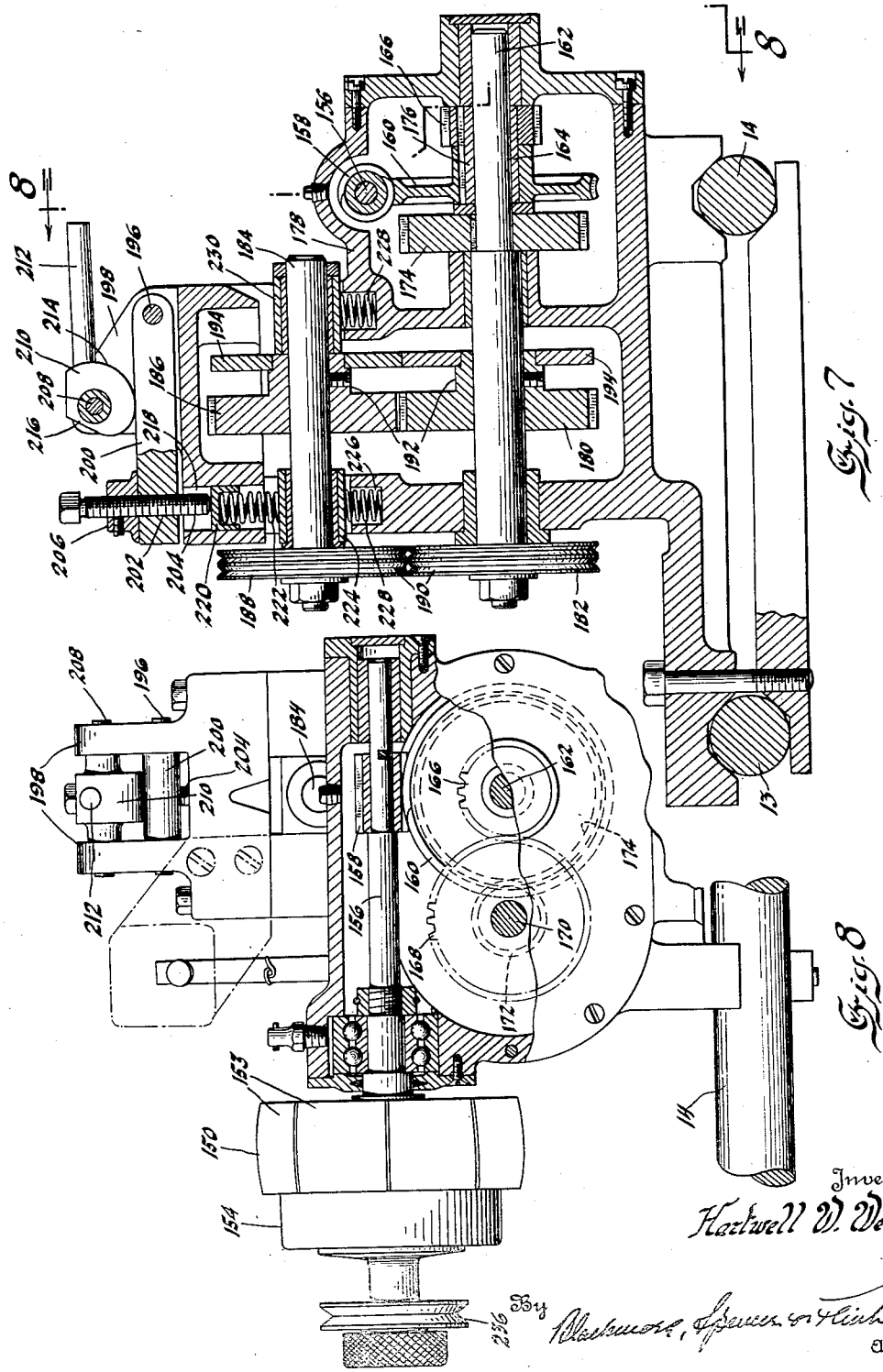

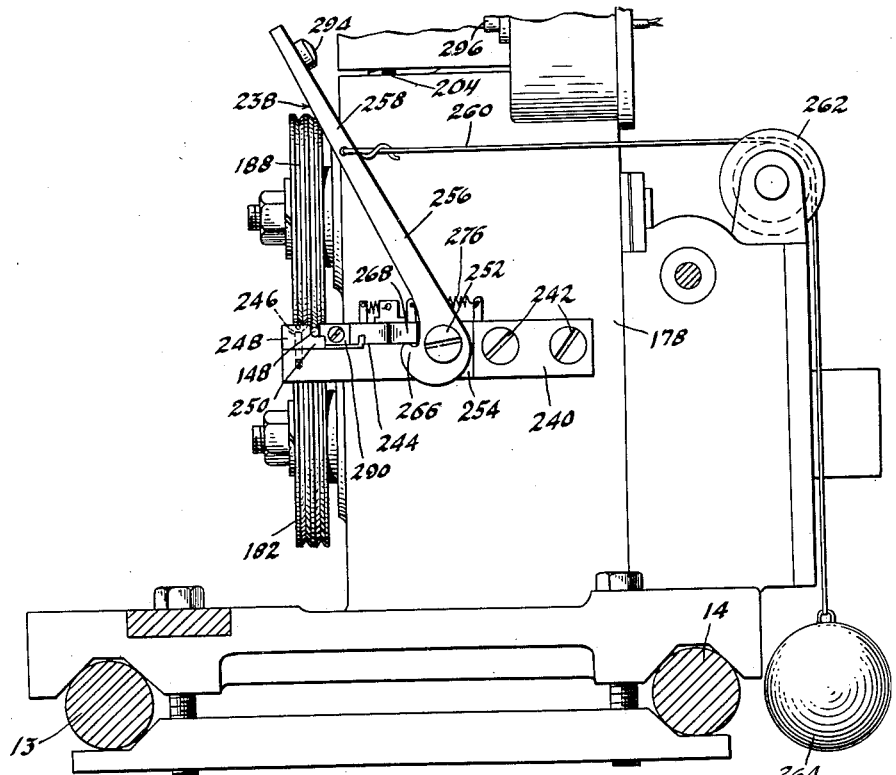
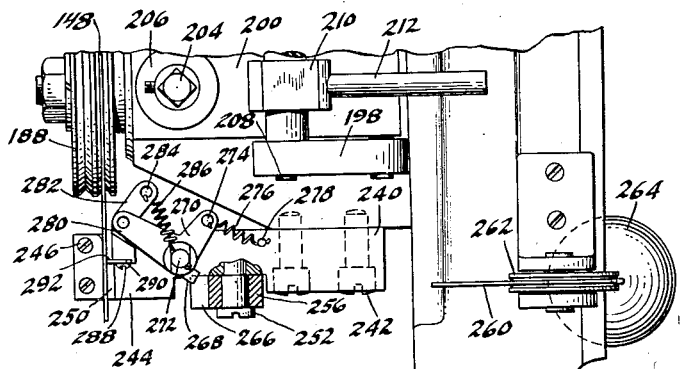

1,847,453

UNITED STATES PATENT OFFICE

HARTWELL W. WEBB, OF FLINT, MICHIGAN, ASSIGNOR TO A C SPARK PLUG COMPANY, OF FLINT, MICHIGAN, A COMPANY OF MICHIGAN

FLEXIBLE CABLE WINDING MACHINE

Application filed June 28, 1928. Serial No. 288,990.

This invention relates to machines for winding flexible cables or shafting of the multistrand type.

Flexible shafts as used for speedometer drives on automotive vehicles or for drives for dental drills, etc., are usually composed of a core wire about which is wrapped a layer of strands (usually 4) in one direction after which there is wrapped a second series of four strands in the opposite direction. This operation is continued until twelve strands or four single thickness layers have been wrapped around the core wire.

The machine of the present invention relates to the type of machine used in forming flexible shafting of the type indicated and comprises the machine proper which includes a flyer, a mechanism for pulling the cable from the flyer and a wire straightener; an unreeling mechanism positioned at one end of the machine, and a reeling mechanism hung from the opposite end of the machine. The unreeling mechanism, the straightener, and the reeling structure are described in copending applications.

The flyer of the present invention comprises a driven shaft to which a rotor is secured. On the rotor is mounted a plurality of spools containing the wire or material to be wound on the core. This wire is guided from the spools onto the core wire by a suitable headpiece forming a portion of the flyer.

From the flyer the cable passes to the pulling mechanism which withdraws the finished cable from the flyer, this withdrawing mechanism comprising a pair of driven rollers one of which is resiliently mounted and held against the second to grip the cable as it is pulled from the flyer. One of the rollers is mounted on a pivoted frame and is capable of movement from and to the other roller. From the unwinding mechanism the finished cable passes through the straightener to the reeling mechanism.

The full reel from the first machine is transferred to the second machine where it forms the core wire. This core has four additional strands wound thereabout in a direction opposite to the first four strands and after the finished cable is wound by the reeling mechanism it is again transferred to a third machine to have the third set of wires wound thereabout and the finished product from the third machine is sent to the fourth where a final layer of strands is placed thereabout giving a finished cable of seventeen strands comprising the core strand and sixteen wound strands.

On the bed of the machine between the unreeling mechanism and the flyer there is mounted an automatic cut-out mechanism which will cause a break in the electrical connection which drives the machine when the core wire has payed out.

Similarly between the withdrawing mechanism and the wire straightener there is placed a second cut-out mechanism which will be brought into operation when one of the strands is missing. This mechanism will also throw an electric switch leading to the motor which drives the mechanism of the cable winding machine.

Referring to the drawings:

Figure 1 shows a side view of the cable winding machine.

Figure 2 is a plan view of the structure shown in Figure 1.

Figure 3 is a sectional view through the flyer.

Figure 4 is a detailed view of the tension device positioned between the spools of the flyer.

Figure 5 is a sectional view on the line 5—5 of Figure 4.

Figure 6 is a detail of the ring in the nose of the flyer head.

Figure 7 is a sectional view on the line 7—7 of Figure 1 taken through the withdrawing mechanism.

Figure 8 is a view taken on the line 8—8 of the structure shown in Figure 7.

Figure 9 is an end view of the machine.

Figure 10 is a view of the cut-out mechanism in the lefthand end of the machine.

Figure 11 is a view on the line 11—11 of Figure 10.

Figure 12 is a view of the electrical cut-out mechanism at the right hand end of the machine.

Figure 13 is a plan view of the structure shown in Figure 12.

Figure 14 is a view of the cable showing the core and the four winding strands.

Referring to the numbered parts on the drawings the letter A indicates the machine as a whole which is driven from an electrical motor M having a pulley P over which runs the belt L to drive the shaft 72, while S indicates the starting switch. At the left hand portion of the machine there is freely and rotatably suspended the unreeling mechanism B while at the opposite or right hand end of the machine there is hung the reeling mechanism C. The machine A in turn comprises the flyer F, the cable withdrawing mechanism G and the wire straightener H.

The unreeling mechanism B is described and claimed in copending application, Serial Number 288,993 filed June 28, 1928.

The wire straightener H, is described and claimed in copending application, Serial Number 288,991 filed June 28, 1928.

The reeling mechanism C is described and claimed in copending application, Serial Number 288,992 filed June 28, 1928.

The unreeling mechanism comprises the bracket 10 which has mounted thereon the reel 12 containing the wire. The bracket 10 is suspended from the rods 13 and 14 by means of the pipe 16 which has a swivelled connection 18 with a supporting plate 20 mounted on the rods 12 and 14.

Supported on the plate 20 is the bracket 22 on which there is mounted an axle 24 of a grooved sheave 26 the lower portion of which runs in a pan 28 filled with oil.

Mounted between the rods 13 and 14 by means of the brackets 30 is an axle 32 for supporting a manufacturer's spool 34. The wire 36 as it comes from the manufacturer is the first core wire and is run directly from the spool 34 through a slotted opening in a plate 38 fastened to the bracket 10. From the plate 38 a wire 36 is wound a few times about the reel 12 and passed up through the pipe 16 and around the sheave 26 where it receives a quantity of oil from the bath in the pan 28.

From the sheave 26 the core wire 36 passes through a short tube 39 held in a bracket 40 mounted on the rods 13 and 14.

Mounted at the left hand side of the bracket 40 is a cut-out mechanism indicated as a whole at 42 and more clearly shown in Figures 10 and 11. The cut-out mechanism 42 is mounted on the bracket 44 and comprises the forked block 46 to which there is pivoted at 48 an arm or lever 50 having a weight 52 secured thereto. Secured to the block 46 substantially in the path of the core wire 36 is a roller 54 and a square block 56. The lever 50 is provided with a roller 58 which rests on the core wire 36 between the roller 54 and the block 56. Within the path of the end of the arm 50 there is positioned the electric push button 60 and when the core wire 36 pays out and passes beyond the block 56 the weight 52 will cause the arm 50 to fall with such force to cause the button 62 at the arm end to strike the push button 60 and throw off the electrical connection to the motor which operates the machine. From the description of the cut-out mechanism as given it will be evident that as soon as the core wire pays out and passes the cut-out mechanism 42 the power for the machine will be thrown off.

From the bracket 40 the core wire 36 passes through the flyer F, best shown in Figure 3. The flyer comprises the driven shaft 64 driven from the pulley 68 having a belt connection 70 to a cross shaft 72 at the base of the frame. The shaft 64 is hollow and has a flanged end as shown at 74. Surrounding the hollow shaft 64 and secured in an upright 76 of a bracket 77 is the stator 78. Surrounding the stator 78 and secured to the flanged end 74 of the hollow driving shaft 64 is the rotor 80 which is mounted in bearings 82 and 84 positioned between the stator 78 and the rotor 80.

Secured at the left hand end of the rotor 80 is a tailpiece 86 having a plurality of equally spaced peripheral openings 88 the purpose of which will be later described.

At the opposite or right hand end of the flyer there is positioned the headpiece 90 which is conical in shape and has the peripheral flange 92 provided with a plurality of openings 94 which conform to the openings 88 in the tailpiece. Between the openings 88 and 94 there extend the hollow wire receiving rods 96 which have a grooved end 98 in which there is received the pointed end of a screw 100 to hold the rods 96 in place.

The end of the rotor 80 has a pair of diametrally positioned teeth or projections which engage in corresponding grooves or slots in the headpiece 90 in order to secure a more rigid connection between the rotor and headpiece.

The hollow driving shaft 64 is mounted at its end in a bearing 102 positioned in an upright 104 of the bracket 77. Extending through the hollow portion of the shaft 64 is a hollow rod 106 having a handle 108 at its free end and being screw threaded at its opposite end as at 110. The screw threaded portion 110 engages a corresponding screw threaded portion of a hollow member 112 positioned centrally of and rigidly attached to the headpiece 90. The function of the hollow rod 106 and handle 108 is to release or secure the headpiece on the flyer. The parts are shown in secured position in Figure 3, however, by turning the handle 108 the hollow shaft 106 may be unscrewed from the member 112 which will permit the headpiece 90 to be withdrawn from the flyer.

The member 112 is hollow and has an outer cup-shaped terminal 114 provided with four symmetrically arranged slots 116 to allow for the passage of the winding strands 118.

Positioned about the cup-shaped end 114 and resting within a recess in the nose piece is the coaxial ring 120 which has a plurality of teeth 122 (see Figure 6) to engage the winding strands to assist in laying them about the core as the flyer is rotating.

Positioned within the cup-shaped end 114 and extending into the bore 124 of the member 112 is the inner cone member 126 which has a passage 128 therethrough to allow for the passage of the core wire 36. Screw threaded into the outer end of the cup-shaped portion 114, is a second cone member 130 the conical portion of which conforms to the conical surface of the cone member 126 and has an opening to allow the core wire to pass therethrough. The outer cone member 130 is screwed into the cup 114 a distance sufficient to allow a space between the conical surfaces. The width of this space is slightly larger than the diameter of the winding strands so as to permit of their ready passage between the cones. The winding strands 118 are wrapped or wound about the core 36 at substantially the end of the outer cone member 130.

Mounted on the rotor 80 are four spools 132 and between each spool and on the outside of the outer spools there is positioned the tensioning member 134 (see Figures 4 and 5). This member 134 comprises the ring shaped member 136, U-shaped in cross section as is shown in Figure 5. Secured in the base of the U by means of the rivets 138 are the flat or leaf springs 140 which project outwardly from the ring and have their ends free and bent toward the ring. When the headpiece 90 is screwed onto the flyer these springs will be pressed into the U and form a tensioning means between the spools so as to prevent their over running and unwinding the wire when the flyer is stopped. Without these tensioning means the momentum of each spool would tend to continue their rotation and cause an unwinding of the material or wire wound thereon.

From each spool 132 the winding wire 118 is led into an arm 142 integral with the hollow tubes 96. The wire passes through and from the end of the hollow tubes 96 over rollers 144 journalled on axles 146 secured in the flyer head 90. From the rollers 144 the wire passes over the conical face of the head 90 past the teeth 122 of the ring 120, through the slots 116, and between the cones 126 and 130. The winding strands are here wound about the core wire 36 as the flyer rotates to form the cable shown at 148 in Figure 3.

The mechanism for withdrawing the cable from the flyer F is best shown on Sheet 4 Figures 7 and 8. The withdrawing mechanism is driven from a pulley 150 by means of a belt 152 driven from the shaft 72. The pulley 150 is built of segments 153 and is expansible in order that the proper speed of the withdrawing mechanism may be attained. The diameter of the pulley 150 is regulated by means of the member 154. The pulley 150 drives the shaft 156 which has secured thereto a worm 158 which drives a worm wheel 160 rotatably mounted with reference to a shaft 162. Secured to a bushing 164 which is keyed to the worm wheel 160, is a gear wheel 166 which drives the gear 168 rigid with a shaft 170. Secured to the shaft 170 is a second gear 172 which meshes with the gear 174 rigid with a shaft 162.

The shaft 162 is suitably mounted in bushings 176 within the housing 178 of the withdrawing mechanism and has secured thereto the gear wheel 180 and the roller 182. Mounted in the housing 178 parallel with the shaft 162 is a second shaft 184 to which there is secured the gear wheel 186 which meshes with the gear 180, and a roller 188 positioned in the same plane as the roller 182. Both rollers 182 and 188 have peripheral grooves 190 adapted to receive the cable as it comes from the flyer. The gears 180 and 186 have secured to integral hubs 192 the discs 194 which are in contact when the pitch circles of the gears are in contact. The function of these discs 194 is to prevent the gears from intermeshing beyond a certain amount and thereby limit the approach of the rollers 182 and 188 to each other.

Pivoted as at 196 to the upper portion of the housing 178 between the ears 198, is a plate 200 the outer end of which has a screw threaded opening 202 for the reception of a screw 204. On the upper side of the plate 200 there is secured a dial 206 the purpose of which is to adjust the distance to which the screw 204 projects past the opening 202 into the housing 178. Between the ears 198 there is provided the pin 208 on which there is mounted the cam 210 having a lever 212 to operate the same. In the position shown in Figure 7 the plate 200 will be held in its lowermost position against the upper portion of the housing 178. However, if the lever is swung in a counterclockwise direction the cam surface 214 will be moved away from the plate and the surface 216 brought in contact therewith, which will permit the plate to be swung on its pivot 196 in a manner which will now be described.

The upper portion of the housing 178 is provided with an opening 218 adapted to receive the end of the screw 204. Positioned within this opening and contacting with the screw end 204 is a cup-shaped piston 220 adapted to receive a coil spring 222, the lower end of which rests on a movable bearing 224 in which the shaft 184 is received. Below the shaft 184 within the openings 226 there are positioned coil springs 228 which press against the bottom sides of the movable bearings 224 and 230 of the shaft 184 and tend to urge it in an upward direction. In the position of the parts shown in Figure 7 all the springs 222 and 228 are depressed or under compression. When the cam lever 212 is swung in a counter-clockwise direction to permit the surface 216 to come in contact with the plate 200 the springs 228 will push the shaft 184 and its roller 188 in an upward direction and cause a separation of the rollers 182 and 188.

By suitably turning the dial 206 to determine the extent to which the screw 204 will enter the opening 218 the exact amount of tension on the springs 222 and 228 can be determined and in this manner there is determined the extent of the grip or pressure which will be exerted by the rollers 182 and 188 on the cable as it leaves the flyer.

The wire straightener H has a grooved pulley 232 secured thereto which pulley is driven by means of a belt 234 passing around a grooved pulley 236 secured to the shaft 156. From the straightener H the cable 148 passes to the reeling mechanism C over a grooved pulley 342, through a passage in the housing 298, and through a bore in the shaft 310 to the spool 314.

Secured to the housing 178 of the withdrawing mechanism and positioned between the rollers 182 and 188 and the wire straightener H is a circuit breaker or cut-out mechanism indicated as a whole at 238 and shown in detail in Figures 12 and 13. The mechanism comprises the base member 240 secured to the side of the housing 178 by means of the screw bolts 242. The base 240 is recessed as at 244 on its upper surface and at the end of the recessed portions there is secured by means of the screws 246 a block 248 which has the inner portion 250 thereof suitably shaped to align with the rollers 182 and 188 and adapted to receive the finished cable 148 as it comes from the rollers. Pivoted as at 252 to the side of the base member 240 at a cut out portion 254 is the arm or lever 256 having the upward end 258 extending a considerable distance away from the base plate 240. Attached to the end 258 is a wire or cable 260 which passes around a grooved pulley 262 and has a weight 264 attached to the opposite end thereof. The weight 264 will constantly urge the arm 256 in a clockwise direction when considering the view shown in Figure 12. The lower end of the arm 256 is hook-shaped as shown at 266 and engages with a lug or stop 268 positioned at the angle of a bell crank lever 270. The bell crank lever 270 is pivoted at 272 in the recessed portion 244 of the base member 240 and has a pin 274 attached to one arm. To this pin there is secured the spring 276 the opposite end of which is attached to a pin 278 secured to the base 240. The second arm of the bell crank lever 270 has its end 280 forked and within the fork 280 there is pivoted at substantially its midpoint a lever 282 having a pin 284 at one end. To the pin 284 there is attached the coil spring 286 the opposite end of which is secured to the pivot pin 272 of the bell crank lever 270. The opposite end of the lever 282 has secured thereto by means of a screw 288 a flat thin blade or plate 290 the edge 292 of which extends outwardly past the lateral surface of the lever 282 and contacts with the finished cable 148 as is seen in Figures 12 and 13.

From the construction as described it will be evident that the springs 276 and 286 tend to urge the bell crank lever 270 and the lever 282 in a clockwise direction about their pivots when considering the construction shown in Figure 13, and if desired suitable means may be provided to limit the clockwise throw of the bell crank 270 to substantially the position shown in Figure 13. The parts are held in the position shown in Figures 12 and 13 by the contact of the edge 292 with the cable 148.

In case one of the winding wires 118 should break or should be payed out from its spool there will be a corresponding space left in the cable as it comes from the flyer and the rollers. The point 292 of the blade 290 will catch in the space and the cable 148 will then pull the arm 282 along therewith which will cause the bell crank lever 270 to be swung on its pivot 272 and free the lug 268 from the path of the hook 266. The weight 264 will now cause a jerk to be given to the arm 256 and cause the upper end to swing in a clockwise direction when considering Figure 12. The force with which the lever 256 is thrown is sufficient to cause the knob 294 at the end of the lever to strike the switch button 296 with a sufficient force to operate the switch and interrupt the electric circuit and thereby throw off the power from the machine.

From the description and operation as given it will be apparent that as soon as one of the winding strands of the cable is missing the cut-out mechanism will come into operation and throw off the power from the machine. This mechanism will therefore insure that a complete and fully wound cable will at all times leave the machine.

The reeling mechanism C at the end of the machine is suspended from the extended ends of the rods 13 and 14 by means of the housing 298. Within the housing 298 there is suitably mounted a worm and worm wheel driven from a shaft 300 having a pulley fixed at its end. The pulley 302 is driven by means of a belt 304 from a second pulley 306 fixed to the end of the shaft 72. The pulleys 302 and 306 are of the variable type as is seen in Figure 1 the purpose of which is to vary the rate of speed at which the reeling mechanism is rotated.

Integral or rigid with the lower end of the casing 298 is the gear 308 and passing through the casing and gear is a shaft 310 driven from the worm wheel in the housing 298 and to which there is fixed the bracket 312 on which the spool 314 is mounted. Secured to a plate 316 fixed to the upper portion of a bracket 312 is a suitable arrangement of intermeshing gears 318 which drive a shaft 320 having a worm at its lower end. The worm drives a worm wheel within the housing portion 322 which in turn drives by means of a slipping clutch a shaft which passes through and is secured to the spool 314.

Fixed to the end of the latter shaft is a wheel 324 having a groove 326 in which there is adjustably secured the pivot pin 328 of a link 330 pivoted at 332 to a bell crank lever 334 the opposite end of which has a pawl 336 operating on a ratchet wheel 338 secured to a shaft 340. The shaft 340 has its opposite end grooved so as to cause a guiding frame to move back and forth to guide the wire evenly onto the spool 314. The specific structure of the reeling mechanism is fully shown and described in my copending application Serial Number 288,992 filed June 28, 1928.

The operation of the machine is as follows:

The core either from the manufacturer's spool 34 or from the reel 12 is passed upward through the pipe 16 over the grooved pulley 26 and through the short length of pipe 39 to the flyer F. At the flyer the winding strands will be twined about the core at the nose of the headpiece 90. The cable as it leaves the nose will be drawn by the driven rollers 182 and 188 and passed along to the wire straightener H where the cable will be kneaded to remove the bends and kinks from the wire. The cable then passes over the grooved pulley 342 to the reeling mechanism where it is wound on the reel 314. In case the core wire breaks or pays out from the spool 34 or reel 12 the cut-out mechanism 42 will be brought into operation and throw off the power from the machine. Should one of the winding strands from the flyer F be payed out or break it will leave a corresponding space in the cable and cause the cut-out mechanism 238 between the rollers and straightener to be brought into operation and throw off the power from the machine.

I claim:

1. In a multistrand cable winding machine, an unreeling mechanism for dispensing a core freely and rotatably hung at one end of the machine, a power driven winding mechanism on the machine for winding strands about said core, a power driven reeling mechanism hung from the opposite end of the machine for winding said cable, and means for drawing the cable through the machine.

2. In a cable winding mechanism, a flyer mechanism including a hollow driving shaft, a stator surrounding said shaft, a rotor fixed to one end of said shaft and surrounding said stator, an adjustable end or headpiece on said rotor, and means extending through said shaft for securing or releasing said headpiece.

3. In a cable winding machine, a frame including a plurality of rods, an unreeling mechanism for a core member freely and rotatably suspended from a pair of said rods at one end of said machine, a winding mechanism on said rods including a flyer for winding strands about said core, a mechanism mounted on said rods for drawing the cable from the flyer, a cable straightener beyond said drawing mechanism, and a power driven reeling mechanism for winding up the cable suspended from the opposite end of said frame from said pair of rods.

4. In a multistrand cable winding machine, an unreeling mechanism freely and rotatably hung at one end of the machine to feed a core for the cable, a power driven winding mechanism on the machine for winding the strands about the core, a power driven mechanism hung from the opposite end of the machine to wind the cable, means for drawing the cable through the machine, and means between the unreeling and winding mechanisms for throwing off the power when the wire from the unreeling mechanism has payed out.

5. In a multistrand cable winding machine, an unreeling mechanism freely and rotatably hung at one end of the machine to feed a core for the cable, a power driven winding mechanism on the machine for winding the strands on the core, a power driven reeling mechanism hung from the opposite end of the machine, means for drawing the cable through the machine, and means between the winding and reeling mechanisms for throwing off the power when one of the cable strands is missing.

6. In a cable winding mechanism, a flyer mechanism including a hollow driving shaft, a stator surrounding said shaft, a rotor fixed to one end of said shaft and surrounding said stator, a tail piece on said rotor, and adjustable end or head piece on said rotor, a plurality of material containing spools mounted on said rotor between said head and tail pieces and axially with reference to said shaft, and means extending through said shaft for securing or releasing said headpiece.

7. In a cable winding mechanism, a flyer mechanism including a hollow driving shaft, a stator surrounding said shaft, a rotor fixed to one end of said shaft and surrounding said stator, an adjustable end or head piece on said rotor, and means extending through said shaft for securing or releasing said headpiece, said means being hollow to allow a core member for the cable to pass therethrough.

8. In a cable winding machine, a flyer comprising a fixed tail piece, a movable headpiece, a rotor on which said pieces are mounted, means to secure said head piece to or permit removal thereof from the rotor, a plurality of material containing spools mounted on said rotor, means between each spool to prevent over-running of the spools, and means for directing the material from each spool over the head piece to adapt it to be wound on a core member passing through the flyer.

9. In a cable winding machine, a flyer comprising a fixed tail piece, a movable headpiece, a rotor on which said pieces are mounted, means to secure said head piece to or permit removal thereof from the rotor, a plurality of material containing spools mounted on said rotor and held in place by said head piece, and means for directing the material from each spool over and in contact with the surface of the head piece to adapt it to be wound on a core member passing through the flyer, said last named means including hollow rods extending between and interconnecting said tail and head pieces.

10. In a cable winding machine, a flyer comprising a fixed tail piece, a movable head piece, a rotor on which said pieces are mounted, a hollow rod extending through the rotor and adapted for screw-threaded engagement with the head piece to secure said head piece to or permit removal thereof from the rotor, a plurality of material containing spools mounted on said rotor, and means for directing the material from each spool over the head piece to adapt it to be wound on a core member passing through the flyer.

11. In a multistrand cable winding machine, a core dispensing mechanism freely and rotatably hung at one end of the machine, a cable winding mechanism for winding strands about said core, and a reeling mechanism for winding up said cable hung from the opposite end of said machine.

12. In a multistrand cable winding machine, a frame including a plurality of supporting bars, a core dispensing mechanism hung from said bars at one end of said frame, a cable winding mechanism mounted on said bars for winding strands about said core, and a reeling mechanism hung from said bars at the opposite end of said frame for winding up said cable.

13. In a flyer for a multistrand cable winding machine, head and tail pieces on said flyer, a shaft between said head and tail pieces, a plurality of strand containing spools mounted on said shaft, and a plurality of hollow rods interconnecting said head and tail pieces for conducting said strands to the flyer head.

14. In a flyer for a multistrand cable winding machine, head and tail pieces on said flyer, a shaft between said head and tail pieces, a plurality of strand containing spools mounted on said shaft, a plurality of hollow rods forming the sole exterior connection between said head and tail pieces for conducting said strands to the flyer head, and an arm on each rod for conducting said strands from each spool to said hollow rod.

15. In a flyer for cable winding machines, said flyer including head and tail pieces, a plurality of strand holding spools mounted on said flyer, and a plurality of hollow members or tubes forming the sole exterior interconnecting means between said head and tail pieces, said strands passing through said members on leaving the spools.

16. In a flyer for cable winding machines, said flyer including head and tail pieces, a plurality of strand holding spools mounted on said flyer, a plurality of hollow members or tubes forming the sole exterior interconnecting means between said head and tail pieces, and hollow arms on said tubes, said strands passing through said arms and members on leaving the spools.

17. In a flyer for cable winding machines, said flyer comprising head and tail pieces, a plurality of wire containing spools mounted on said flyer between said head and tail pieces, and guiding means between said head and tail pieces forming the sole exterior interconnection therebetween, said means receiving the strands and guiding them from said spools to said head piece.

18. In a cable winding machine, a mechanism for withdrawing the cable therethrough including a plurality of juxtaposed rollers, shafts on which said rollers are mounted, one of said shafts adapted to be separated from the other, resilient means urging said one shaft from the other, and means to force said shaft against the tension of said resilient means to cause said rollers to peripherally engage.

19. In a cable winding machine, a mechanism for withdrawing the cable therethrough including a plurality of juxtaposed rollers, shafts on which said rollers are mounted, one of said shafts adapted to be separated from the other, resilient means urging said one shaft from the other, means to force said shaft against the tension of said resilient means to cause said rollers to peripherally engage, and means resiliently holding said shaft in position when said rollers are in contact.

20. In a cable winding machine, a mechanism for withdrawing the cable through the machine, comprising a pair of driven shafts, means for resiliently and movably mounting one of said shafts, rollers rigidly mounted on said shafts in juxtaposed relation, means for varying the tension of said resilient means, and means for releasing said resilient means to permit said resiliently mounted shaft to separate from the other to separate the rollers.

21. In a cable winding machine, a mechanism for withdrawing the cable through the machine, comprising a pair of driven shafts, means for resiliently and movably mounting one of said shafts, rollers rigidly mounted on said shafts in juxtaposed relation, means for varying the tension of said resilient means, and a pivoted plate and a cam acting thereon for releasing said resilient means to permit said resiliently mounted shaft to separate from the other to separate the rollers.

22. In a power driven cable winding machine, means for dispensing a core wire, means operating solely on the core wire for shutting off the power when the core wire is broken or has payed out, means for winding a plurality of strands on said core, means operated solely from said strands after being wound on the core for shutting off the power when one of said strands is missing, and means for reeling up the cable.

23. In a cable winding machine, an axially rotatable core dispensing reel at one end of the machine, a freely turnable mount for said reel, means for winding a plurality of strands on said core, a power driven rotatable reel for winding up said cable, means for mounting said last named reel and means for rotating said mounting means.

24. In a flyer for cable winding machines, means for mounting a plurality of strand containing spools on said flyer, head and tail pieces to said flyer, and means connecting said head and tail pieces, said means rigidly secured to one of said pieces and having a slip fit with the other to permit the removal of one of them from the flyer to allow the removal or insertion of other spools.

25. In a flyer for cable winding machines, means for mounting a plurality of strand containing spools on said flyer, head and tail pieces to said flyer, and a plurality of tubes connecting said head and tail pieces, said tubes rigidly secured to one of said pieces and having a slip fit with the other to permit the removal of one of them from the flyer to allow the removal or insertion of other spools.

26. In a flyer for cable winding machines, means for mounting a plurality of strand containing spools on said flyer, head and tail pieces to said flyer, and a plurality of tubes connecting said head and tail pieces, said tubes rigidly secured to one of said pieces and having a slip fit with the other to permit the removal of one of them from the flyer to allow the removal or insertion of other spools, the strands on said spools passing though said tubes when leaving the flyer.

27. In a flyer for cable winding machines, means for mounting a plurality of strand containing spools on said flyer, head and tail pieces to said flyer, a plurality of tubes connecting said head and tail pieces, said tubes rigidly secured to one of said pieces and having a slip fit with the other to permit the removal of one of them from the flyer to allow the removal or insertion of other spools, the strands on said spools passing through said tubes when leaving the flyer, and friction reducing means on said head at the ends of said tubes to receive the strands as they pass from the tubes.

In testimony whereof I affix my signature.
HARTWELL W. WEBB.